April 17, 1951 V. C. RIDEOUT 2,549,131
RADAR EQUIPMENT TESTING SYSTEM
Filed Aug. 22, 1946 2 Sheets-Sheet 1
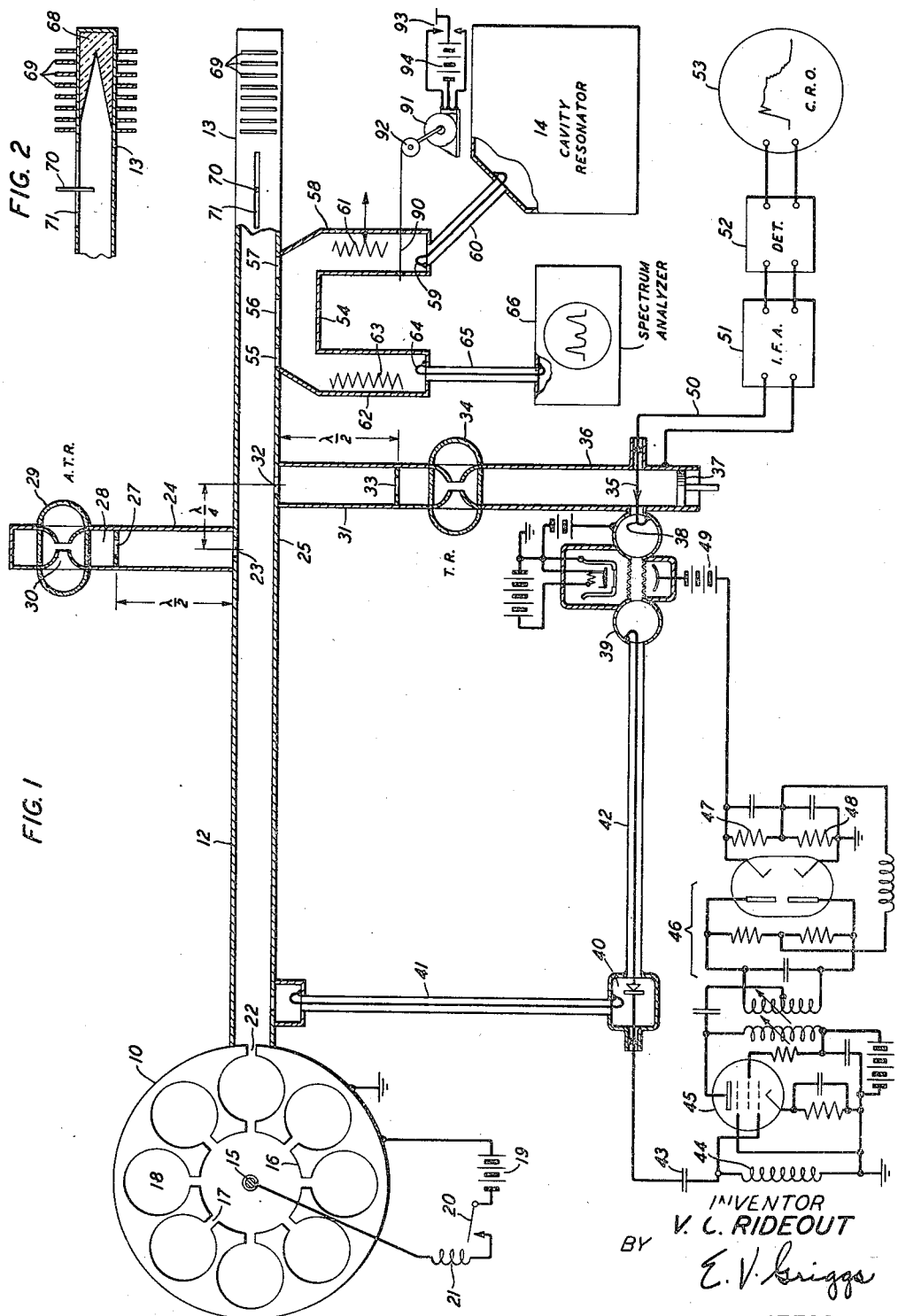

April 17, 1951 V. C. RIDEOUT 2,549,131
RADAR EQUIPMENT TESTING SYSTEM
Filed Aug. 22, 1946 2 Sheets-Sheet 2

INVENTOR
V. C. RIDEOUT
BY
E. V. Griggs
ATTORNEY

Patented Apr. 17, 1951

2,549,131

UNITED STATES PATENT OFFICE 2,549,131

RADAR EQUIPMENT TESTING SYSTEM

Vincent C. Rideout, Red Bank, N. J., assignor to Bell Telephone Laboratories, Incorporated, New York, N. Y., a corporation of New York Application August 22, 1946, Serial No. 692,356

6 Claims. (Cl. 343—5)

This invention relates to testing systems and more particularly to testing apparatus for short pulse microwave transmitters such as those used for radar systems.

An object of the invention is to provide a testing apparatus which may be permanently associated with a microwave transmitter without impairing the normal operation of the transmitter.

Another object of the invention is to provide a testing equipment for combined microwave transmitting and receiving apparatus which may be continuously associated with the transmitting and receiving apparatus and which shall permit the transmitting and the receiving apparatus to perform their customary transmitting and receiving functions substantially unimpaired by the association of the testing equipment.

Radar systems ordinarily comprise microwave transmitters adapted to emit pulses of waves of a few centimeters in wavelength each pulse enduring for a period of the order of a microsecond with periods intervening between pulses of the order of 200 to 500 microseconds. An emitted pulse radiated as an electromagnetic wave toward a remote object is partly reflected thereby and the reflected energy returns to the radar station to indicate by its arrival time at the associated radio receiver the echo interval and hence the distance of the remote object. As the receiver must be very sensitive to respond to such echoes and the transmitter should be relatively powerful to override extraneous effects, it is desirable to protect the receiver from the high power energy of the transmitter during its transmission. It is also desirable to connect both the transmitter and the receiver to a common circuit so that in the case of transmission to different points as, for example, where a scanning antenna is used it may be made certain that the reflections of energy directively transmitted in a given direction may be definitely directively received from that same direction. This common connection with the high power transmitter accentuates the necessity for protecting the sensitive receiver. Such protection is commonly effected by an electronic switch known as a TR (transmit-receive) box which serves to short-circuit or to otherwise disable the input to the sensitive radio receiver during the high energy pulse transmission and to remove the short-circuit or to restore the operative condition of the receiver immediately upon cessation of the pulse.

For testing apparatus involving a microwave transmitter and a microwave receiver alternately connected to a common antenna or other transmission circuit, cavity resonator equipments known as "echo boxes" have been used. These devices comprise resonant cavities with electromagnetic wave energy pick-ups exposed to the field of the common antenna so that during transmission of an impulse the resonant cavity builds up an internal electromagnetic field thus effectively storing energy which, upon cessation of the impulse, it may yield to the common antenna and to the microwave receiver connected thereto. The time taken for the fraction of the stored energy which reaches the receiver to exponentially decay to a level at which it equals, or is just indistinguishable from the receiver noise is a rough measure of the over-all transmission efficiency of the entire microwave system including the transmitter, receiver and antenna. In testing systems of the type which has been described it has been customary to place the energy pick-up device associated with the echo box, which is ordinarily a small antenna, at a location at which it will receive energy during part or all of the scanning cycle of the principal antenna. It is advantageous, however, to avoid the variable factors which enter into a system involving radiation and reception of electromagnetic waves particularly in the case where one of the antennae is in motion with reference to the other. For that reason the apparatus in accordance with the present invention is directly coupled to the circuit of the energy transmission path which connected the radio transmitter and radio receiver to their common antenna. This dispenses at once with the difficulties due to the radiation over a space path and the variable factors introduced by the moving antenna. Although this testing system no longer tests the antenna it is quite adequate since the antenna is an inert part of the radar containing no vacuum tubes and is hence less liable to trouble of any sort.

In accordance with the invention, the microwave transmitter and receiver are connected to a common microwave antenna by a wave guide section. At a point of the wave guide section between the antenna and the connections to the microwave transmitter and microwave receiver a cavity resonator of the echo box type is connected by an aperture coupler of the directional type. The directional coupling insures that the resonator will receive energy from the transmitter when that energy is outgoing over the wave guide but will not receive incoming energy from the wave guide or energy reflected from the remote terminal of the wave guide. Moreover, the directional coupling insures that at the cessation of the radio transmitter impulse when the cavity resonator is fully energized and begins to return energy to the wave guide it will return that energy in the direction of the radio receiver but will not send it out in the direction followed by microwave energy outgoing from the radio energy transmitter.

In order to insure that as the oscillator is tuned over its frequency range the apparatus will operate over the desired frequency range, it is desirable that the cavity resonator be of a multiresonant type having a plurality of closely adjacent frequency responses through the range of frequencies in which the oscillator frequency may fall so that the test indication may not be lost in a so-called "hole" between widely separated responses of the cavity resonator. For this purpose, it is desirable to increase the number of responses of the resonator in accordance with the disclosure of application, Serial No. 608,287, filed August 1, 1945, by S. A. Schelkunoff for Multiresonant Cavity Resonators, which issued as Patent No. 2,518,383 on August 8, 1950, by making the cavity resonator with the conformation of an orthogonal parallelepipedon having its three cardinal dimensions of slightly different magnitudes and having one or more corners cut off by diagonal planes, the openings at the corners being closed by triangular electrical conducting plates. This insures that the resonances will not be degenerate—that is several will not fall at the same frequency except for random coincidences. Furthermore the cavity should be of a length of at least ten wavelengths on a side.

In the drawing Fig. 1 is a schematic diagram of a testing system employing the invention;

Fig. 2 is a side view of the terminal portion of the wave guide of Fig. 1;

Figure 6:
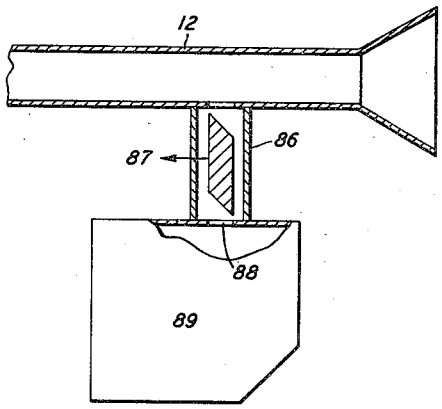

Fig. 6 presents a still different modification, and

Figure 7:
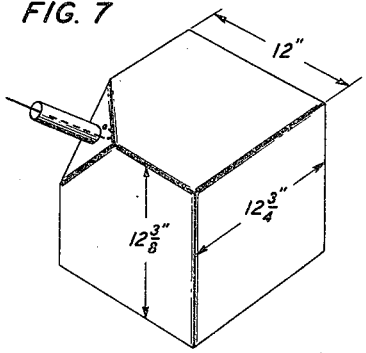

Fig. 7 illustrates in perspective one embodiment of the cavity resonator which may be employed.

Referring to Fig. 1 of the drawing there is shown in schematic diagram a radar test system in which a magnetron or other microwave oscillator 10 constituting the transmitting energy generator of the radar supplies oscillations to a wave guide 12 to be transmitted to an antenna or other energy-absorbing terminal 13. The oscillator 10 may, for example, produce pulses of a half microsecond duration transmitted at high power as, for example, 50 kilowatt peak power. A rectangular pulse of 0.5 microsecond has a spectrum 4 megacycles wide between the first minima resonance frequencies. It is desirable in such microwave radar systems to be able to check the efficiency of the system and especially to insure that the transmitter and receiver are similarly tuned. A very small portion of the impulse energy transmitted by the source 10 to the wave guide 12 may be stored during the impulse transmission period in a cavity resonator 14 coupled to the wave guide and may be returned to the wave guide by the resonator as an exponentially decaying "ringing" signal. Immediately after cessation of the transmitted pulse, this returned "ringing" signal may be picked up and measured by the radio receiver or indicated by a cathode ray oscilloscope connected to the radio receiver.

The magnetron 10 which may be of the multicavity type is shown diagrammatically with a central cathode 15, a plurality of anodes separated by slots 17 leading to resonant cylindrical cavities 18. An energizing circuit of the magnetron comprises a unidirectional current source 19 having its negative terminal connected to the cathode and its positive terminal adapted to be connected to the anodes through a switch or pulsing circuit closer 20 and a microwave choke coil 21. One of the cavity resonators is connected by a slot 22 to the end of the wave guide 12 so that during intervals when switch 20 is closed and the magnetron is suitably energized electrically and magnetically microwaves will be delivered to the wave guide 12. A brief description of such magnetrons may be found at pages 219–223 of the Bell Laboratories Record for June 1946, vol. 24, No. 6.

Associated with guide 12 by a coupling aperture 23 is an ATR guide section 24. The guide section 24 serves during transmission of a pulse as if effectively electrically disconnected from the guide but upon termination of the pulse to present a high impedance in the region 25 of the guide to incoming oscillation energy or reflected energy traversing the guide in the direction toward the magnetron 10. During closure of the switch 20, the magnetron is active to transmit a pulse to the guide 12 and the energy of this pulse coursing along the guide is partly diverted by coupler 23 to the guide section 24. A slot 27 in the section 24 at half wavelength distance from aperture 23 permits some of the energy reaching section 24 to pass into the resonant cavity 28 in which is the ATR switch 29 comprising a sealed glass or other dielectric receptacle extending transversely to the resonant cavity 28. Within the switch 29 are two flat faced metallic electrodes 30 electrically connected to the opposite walls of the cavity resonator 28 and an atmosphere of ionizable gas which readily breaks down at electric field intensities of the magnitude imposed by outgoing pulses from the magnetron 10. Breakdown of the gap between electrodes 30 results in an ionization condition within the enclosed gaseous portion of the resonator 28 which electrically presents a short circuit across coupling slot 27 to set up a similar short-circuited electrical condition at the aperture 23 a half wave-length distant from slot 27. Accordingly, for the duration of the pulse from the magnetron, the guide section 24 has very little effect upon transmission in guide 12.

At a point a quarter wavelength distant along the guide 12 from aperture 23 another wave guide section 31 is coupled to the guide by an aperture 32. Section 31 also contains a slot or aperture coupler 33 at a half wavelength distance from aperture 32 and a TR box switch 34 which is similar in construction to the ATR switch 29. Like the device 29, the switch 34 breaks down to short-circuit aperture 32 and so to protect from the high power field which might otherwise be induced in the guide 31 the sensitive radio receiving apparatus connected to the section 31 beyond the switch 34.

A sensitive first detector 35 of the radio receiver is connected to a transverse pick-up extending across the portion 36 of the guide 31 which is tunable by means of a piston 37 to enhance the field in the region of the pick-up. The detector is also coupled by a loop 38 to the field of a reflex beating oscillator 39 of the general type described by J. R. Pierce in an article entitled "Reflex Oscillators" at pages 112–118 inclusive of the Proceedings of the Institute of Radio Engineers for February 1945. A converter 40 is connected to guide 12 by coaxial line 41 and to reflex oscillator 39 by coaxial line 42. The output circuit of the converter 40 yields a beat frequency current which is supplied by way of condenser 43 and inductor 44 to the input circuit of an intermediate frequency amplifier 45 and tandem connected discriminator 46 of the type disclosed at Fig. 22 (a), page 655 of Terman's Radio Engineer's Handbook published by McGraw-Hill Book Company, first edition 1943. The output of the discriminator is a unidirectional current which varies in magnitude with the differences between the frequencies of the oscillations supplied to guide 12 and those produced by oscillator 39. This unidirectional current traverses resistors 47 and 48 in the anode circuit of oscillator 39 to set up frequency controlling potentials which in conjunction with the electromotive force of a source 49 serve to vary the frequency of the oscillator 39 in the proper direction to cause the beat frequency to remain substantially constant.

Oscillations reflected within the guide from the terminal 13 and coursing toward the magnetron reach the aperture 32 and the guide 31 while the TR box is still "fired" by the original magnetron pulse power and so no energy from such reflections will appear at the receiver unless 13 is at the end of a wave guide long enough to delay the returned echo by a time (about a half microsecond or so) sufficient for the TR box to "recover." However, incoming energy received after restoration of the TR box to normal interacts with oscillations of the control beating oscillator 39 in the sensitive first detector or converter 35 to produce intermediate frequency oscillations which pass over the output circuit 50 to the intermediate frequency amplifier 51 and the tandem connected second detector 52 of the radar radio receiver. The output current of the detector 52 may be transmitted to any suitable indicating or recording apparatus as, for example, the cathode ray oscilloscope 53. The cathode ray oscilloscope may be provided with the conventional "saw tooth" sweep circuit not shown, connected directly to the source 19 and switch 20 to apply to the horizontal deflecting plates of the oscilloscope, just before the magnetron emits each pulse, a sweep circuit pulse to cause the illuminated spot on the oscilloscope face to travel from left to right linearly with time. The incoming pulses received and detected by detectors 35 and 52 are applied to the "vertical" plates of the oscilloscope and cause the illuminated spot to undergo vertical displacements proportional to their strength at horizontal positions corresponding to their times of arrival in accordance with the well understood current practice in this art.

The apparatus so far described in detail constitutes a radar transmitting and receiving equipment. One testing equipment feature of the present invention comprises a two branch auxiliary wave guide 54 having a plurality of apertures 55, 56, and 57 opening into the wave guide 12 to serve as a directional coupler between the guide 12 and the auxiliary section 54. Such directional couplers are disclosed and claimed in the copending application of Mumford Serial No. 540,252, filed June 14, 1944 for Directive Pickup for Transmission Lines. The operation of such a coupler 54 is such as to transmit energy propagated along the guide 12 in the direction of the terminal 13 into the auxiliary section 54 in the same direction so as to reach the right-hand branch 58 and to be impressed upon the coupler 59 to which is connected the coaxial line 60 coupled to the multiresonant cavity resonator 14. The dimensions of a resonator for a radar operating at 8.8 to 9.2 kilomegacycles may be roughly of the order of 12″×12⅜″×12¾″ i. e. of the order of 10 wavelengths with a corner cut off to increase the number of natural resonances. The number of different frequency resonances is increased and their separation decreased by this expedient of different dimensions. A difference of the order of 3 per cent has been found highly advantageous. The ring time in general increases with increase in the resonator dimensions. Moreover, the ratio between maximum and minimum responses at natural resonance frequencies decreases with increase in these dimensions. Accordingly, while the magnetron 10 is transmitting energy to the terminal 13 a small portion of the energy will be fed to the multiresonant cavity 14 to build up an internal electromagnetic oscillation field therewithin. To vary the strength of this field and thus the length of the returned ringing signal the right-hand branch 58 of the auxiliary section 54 is provided with a variable attenuator 61, of a type which will be described more fully hereinafter.

In Fig. 1 the terminal 13 is illustrated as an energy or absorber or sink. In actual practice it may be of that character where for any reason it is desired not to transmit energy as, for example, where in the calibration or testing of radars in their final construction tests or in other situations echoes from nearby moving objects might cause undesired interference with the test or checkup. However, it is to be understood that the termination 13 may also represent an actual energy radiating and absorbing antenna such as would be present in the case of an airborne radar under test. In the claims the expressions "energy dissipating element" and "power dissipating device" and "terminal load" will be understood to be applicable either to antennas or to an energy sink serving merely as a terminating element for the guide 12.

The left-hand branch 62 of the auxiliary section 54 is used for testing of the cavity resonator or echo box. It is provided with an impedance matching attenuator 63 and with a terminal coupling loop 64 from which the coaxial line 65 leads to a spectrum analyzer 66 which may show the relative intensities and separations of the various frequency components of the exponentially decaying signal wave train returned by the cavity resonator 14. This permits photographing the record of the device 66 to enable a permanent record to be made of the characteristic performance of cavity resonator 14 when excited by source 10. The attenuator 63 is used to adjust the level of these frequency components to a value suitable to the device 66.

When the radar equipment is being used for very distant objects the returning "echoes" from the objects will arrive after the echo from the resonator 14 has ceased. However, when the radar is being used for relatively close objects the prolonged echo from the resonator 14 will interfere. In order to prevent this a flexible metallic shutter or short-circuiting sheet 90 may be provided to slide through a slot in the wall of branch 59 to cut off transmission from resonator 14. A reversible motor 91 may drive a spring drum 92 on which the shutter is mounted and the motor may be controlled by a reversing switch 93 connected in series with the motor through a source 94.

Figure 3:
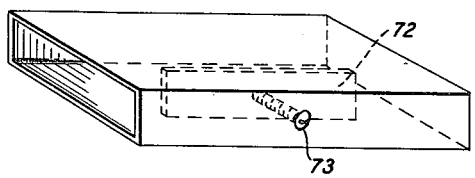
Fig. 3 is a perspective of a wave guide attenuator of the type used in the system of Fig. 1.

Fig. 3 shows an attenuating device 72 of the types disclosed at 61 and 63 in Fig. 1. Such devices may be made of resistance materials produced by the International Resistance Corporation as, for example, thin strips of phenolic condensation products coated with carbon. The attenuator 72 may be movable laterally, that is, toward and from the narrow side of the wave guide by any simple expedient such as a position adjusting screw 73. The attenuator 72 should be tapered on the end in the direction from which energy to be absorbed is progressing.

Figure 4:
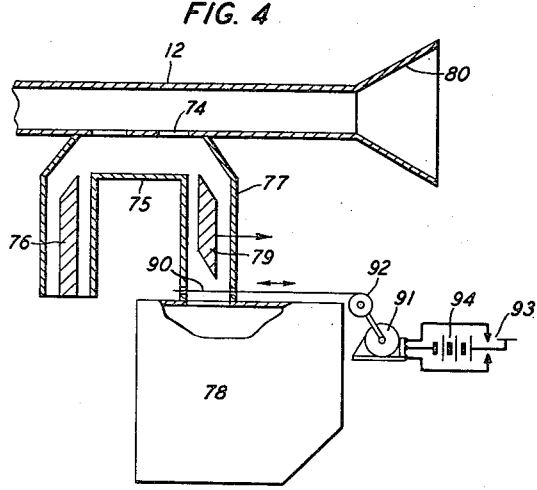
Fig. 4 represents a modification of the directive coupling and cavity resonator of Fig. 1.

Fig. 4 illustrates a simplified structure particularly suitable for testing of radars in which the wave guide 12 is coupled by a directive multiple aperture coupling 74 to an auxiliary wave guide section 75, the left-hand branch of which is provided with a terminating energy absorber 76 and the right-hand branch 77 of which is connected to a multiresonant cavity resonator 78. In this instance a variable attenuator 79 may be utilized to reduce the amount of energy returned to the receiver from the resonator 78 by attenuating the pulses going toward resonator 78 and the decaying "rings" returning from the resonator 78.

Figure 5:
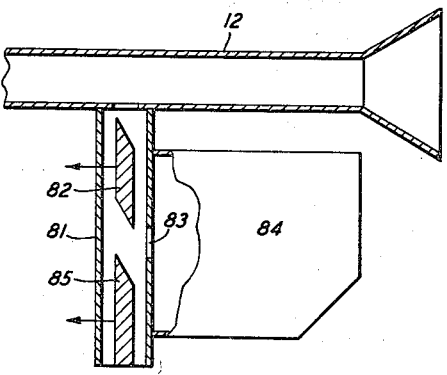
Fig. 5 shows a second modification of the coupler and resonator.

Fig. 5 discloses a non-directive coupling between an auxiliary wave guide section 81 and the guide 12. Energy received by the auxiliary section 81 is reduced by the attenuator 82 before passing through aperture 83 to the multiresonant resonator 84. An impedance match between the coupling aperture 83 and the section 81 is provided by the short stub continuation of section 81 and its terminating attenuator 85.

A still simpler modification is shown in Fig. 6 in which the auxiliary section 86 including an impedance attenuator 87 is coupled through the aperture 88 to multiresonant cavity resonator 89.

The resonator 14 as illustrated in Fig. 7 may have the conformation of an orthogonal parallelopiped with a corner cut off and closed by a triangular plate so as to provide a series of natural resonances, the contiguous ones of which are separated by random frequency separations averaging a few kilocycles.

With the apparatus as described energized by the closing of switch 20 a pulse of high power oscillations will be supplied to the wave guide for a period, the duration of which is normally not in excess of the order of a microsecond and is dependent upon the duration of closure of the switch 20. The high power pulse sets up an ionization condition in the devices 29 and 34 and, accordingly, effectively electrically isolates the sections 24 and 31. A small portion of the energy of the outgoing pulse builds up a field within the resonator 14. The major part of the pulse energy may pass out of the terminal 13 if it be constructed as a radiant energy transducing element as in Figs. 4, 5 and 6. However, if constructed as shown in Fig. 1 with an energy absorber 68 having a tapered conformation and with heat dissipating fins 69 the energy of the high power pulse will be substantially entirely absorbed and dissipated in the terminal 68. To improve the conjugacy of the left-hand branch 62 of the auxiliary guide with reference to the high power source 10, a simple probe 70 may be provided. The probe 70 may be adjustable with respect to its depths of projection into the electromagnetic field and it may also slide along a longitudinal slot in the wave guide 12. When set in the proper position and at the proper depth in the field it will produce a small reflected pulse to cancel any of the original magnetron pulse reaching the wave guide branch 62. It will therefore be seen that during the transmission of an outgoing pulse the sections 24 and 31 are isolated from the guide 12 and the left-hand branch 62 of the auxiliary section 54 is effectively disconnected. The pulse energy accordingly passes mainly to the terminal portion 13 with a small fraction going to the storage resonator 14.

Upon cessation of an outgoing pulse the devices 29 and 34 deionize and the resonator 14 begins to deliver the stored energy of its internal electromagnetic field back to the auxiliary section 54. A portion of that energy may pass to the left-hand branch 62 and its frequency components may be indicated by the spectrum analyzer 66. Another portion of the energy returned by the resonator 14 will pass through the directive coupler to the wave guide 12 in a direction away from the terminal 13. Upon reaching the aperture 32 it will pass into the wave guide section 31 and interact at the converter 35 with oscillations from the local oscillator 39 to produce intermediate frequency oscillations which, after amplification by the device 51 and detection by device 52 may be recorded by cathode ray oscillograph or other recorder 53. During the return of the energy from the resonator 14 the section 24 will serve effectively as a short circuit across the wave guide 12 at its position a quarter wavelength beyond the aperture 32. It will, therefore, reflect the impedance of the section 24 to the position of the aperture 32 as an extremely high or open circuit impedance. At the same time deenergization of the magnetron causes its impedance to increase very greatly. It follows that the region of the wave guide 12 to the left of the aperture 32 will absorb relatively little of the oscillation energy.

It will be apparent that the systems disclosed provide a radar with a coupled testing equipment which does not interfere with the normal operation in the radar and which is capable of indicating the performance efficiency of the radar and so enabling it to be brought to optimum condition.

What is claimed is:

1. In a system for testing oscillation sources, a dielectric wave guide, an oscillation source, an oscillation energy detecting device, an energy dissipating element, a cavity resonator, means for alternately connecting the oscillation source and the detecting device to the wave guide at one region thereof, means for connecting the energy dissipating element to the wave guide in another region and an auxiliary wave guide directional coupler connecting the resonator to the wave guide at an intermediate region of the wave guide and a frequency spectrum analyzer connected to said coupler to receive energy radiated by said resonator.

2. In combination, an energy transmitter and an energy receiver, a wave guide, means for connecting the transmitter and the receiver alternately to the wave guide, a power dissipating device connected to the wave guide, a resonant cavity and means intermediate to the connections to the transmitter and the power dissipating device an auxiliary U-shaped wave guide directional coupler between the wave guide and the resonant cavity and a frequency spectrum analyzer connected to one leg of said coupler to pick up energy radiated from said resonator.

3. In combination, an energy transmission channel, an oscillation transmitter, an oscillation receiver, means for alternately effectively connecting said transmitter and said receiver to said channel, a terminal load comprising an energy radiator and energy collector also connected to said channel to receive energy from said transmitter, a cavity resonator and means intermediate the connection to the transmitter and that to the terminal load for directively coupling the resonator to the channel to impress upon the resonator energy passing toward the load but to protect the resonator from energy propagated from the direction of the load and visual means for resolving the spectrum of frequencies radiated from said resonator.

4. A radar system comprising an antenna, a transmitter and a receiver connected thereto, a cavity resonator and means directively coupling the resonator to the transmitter and receiver to permit it to receive oscillation energy from the transmitter and to return some of the received energy to the receiver, the directive coupling being substantially nil for transmission to or from the resonator in the reverse directions and a shutter for short-circuiting the energy from said resonator when the radar targets are close to said antenna.

5. In combination, a dielectric wave guide, a source of oscillations, an oscillation detector, means for alternately connecting said source and said detector to said wave guide, an antenna connected to the wave guide at a point electrically remote from the connection to the source, a wave guide section having a directive aperture coupling to said wave guide at a point between the source and the antenna, a frequency spectrum analyzer and a multiresonant ringing cavity resonator comprising a conductive cubic box having a skewed corner connected to opposite ends of said wave guide section whereby the resonator receives energy only from the direction of said source and returns it towards said source, and said frequency spectrum analyzer receives energy only from the direction of said antenna and said resonator.

6. A radar system comprising an antenna, a transmitter, a receiver, a pulse wave form indicator comprising a cathode ray oscilloscope tube, each thereof connected to a main transmission line, a directional coupler connected to said line having at one point thereof a cavity resonator of high Q, whereby the resonator may be excited by a fraction of the transmitted energy, and a frequency spectrum analyzer electrically connected to said coupler to analyze the ringing response of said resonator.

VINCENT C. RIDEOUT.

REFERENCES CITED

The following references are of record in the file of this patent:

UNITED STATES PATENTS

| Number | Name | Date |
|---|---|---|
| 2,315,313 | Buchholz | Mar. 30, 1943 |
| 2,337,184 | Carter | Dec. 21, 1943 |
| 2,401,717 | Wolff | June 4, 1946 |
| 2,405,612 | Schelkunoff | Aug. 13, 1946 |
| 2,405,814 | Brannin | Aug. 13, 1946 |
| 2,414,456 | Edson | Jan. 21, 1947 |
| 2,420,211 | Tourshou | May 6, 1947 |
| 2,421,016 | Deloraine | May 27, 1947 |
| 2,422,190 | Fiske | June 17, 1947 |
| 2,423,023 | Hershberger | June 24, 1947 |
| 2,424,267 | Carter | July 23, 1947 |
| 2,433,868 | Sensiper | Jan. 6, 1948 |
| 2,460,827 | Isely | Feb. 8, 1949 |
| 2,489,075 | Bishop | Nov. 22, 1949 |

OTHER REFERENCES

Institute of Radio Engineers Publication Directional Couplers, by W. W. Mumford, May 6, 1946.